Jan. 14, 1969　　　J. F. ORLOFF ET AL　　　3,421,562
TENSION STRESSED STRUCTURE
Filed March 24, 1966　　　　　　　　　Sheet 1 of 3
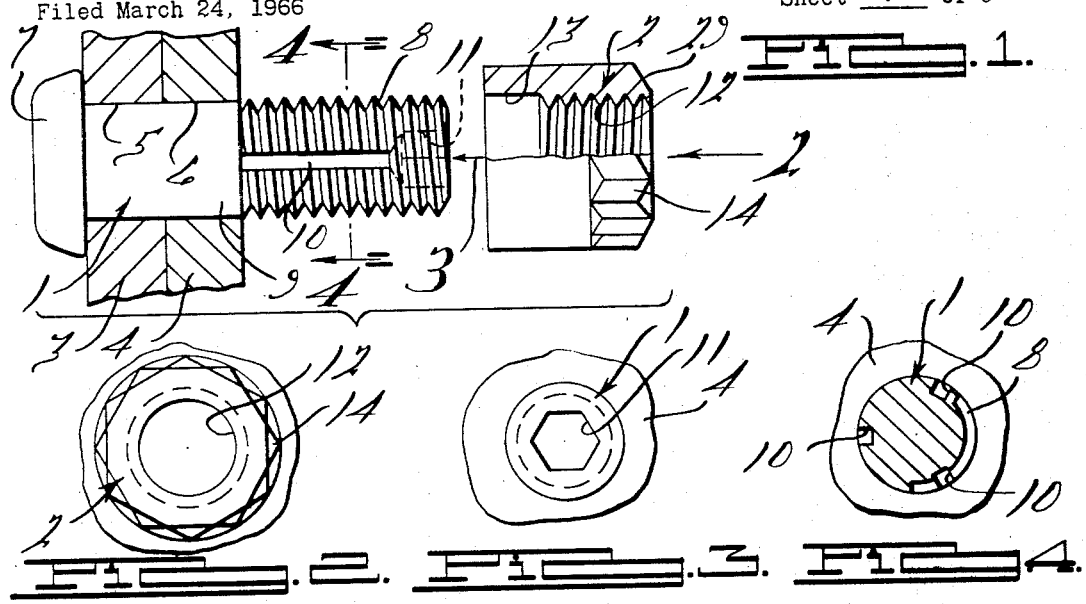
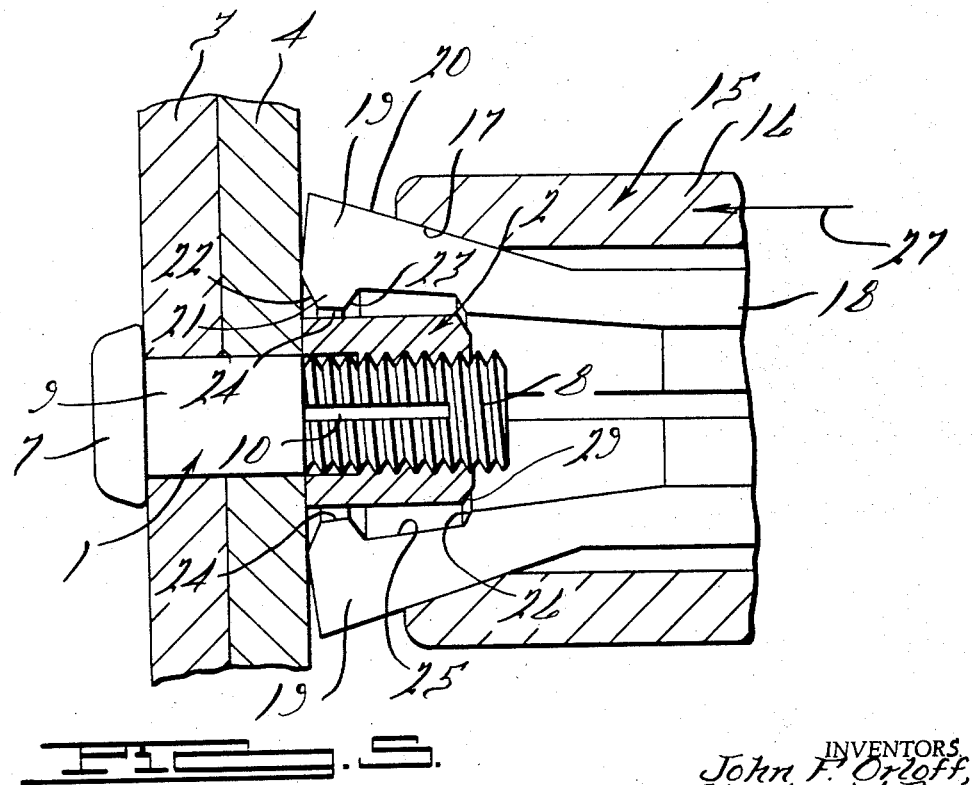
INVENTORS
John F. Orloff,
Charles W. Baugh
BY Harness, Dickey & Pierce
ATTORNEYS.

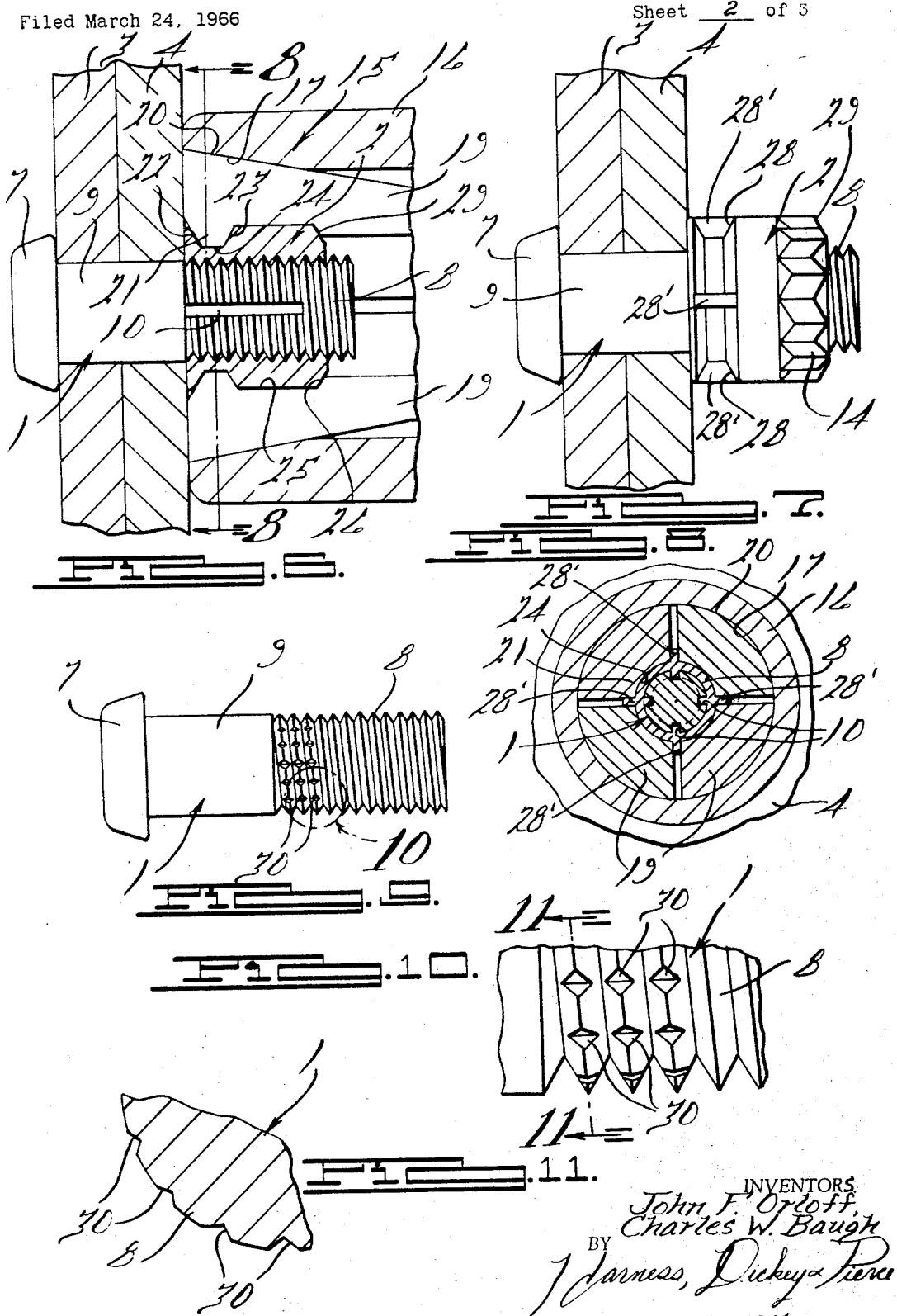

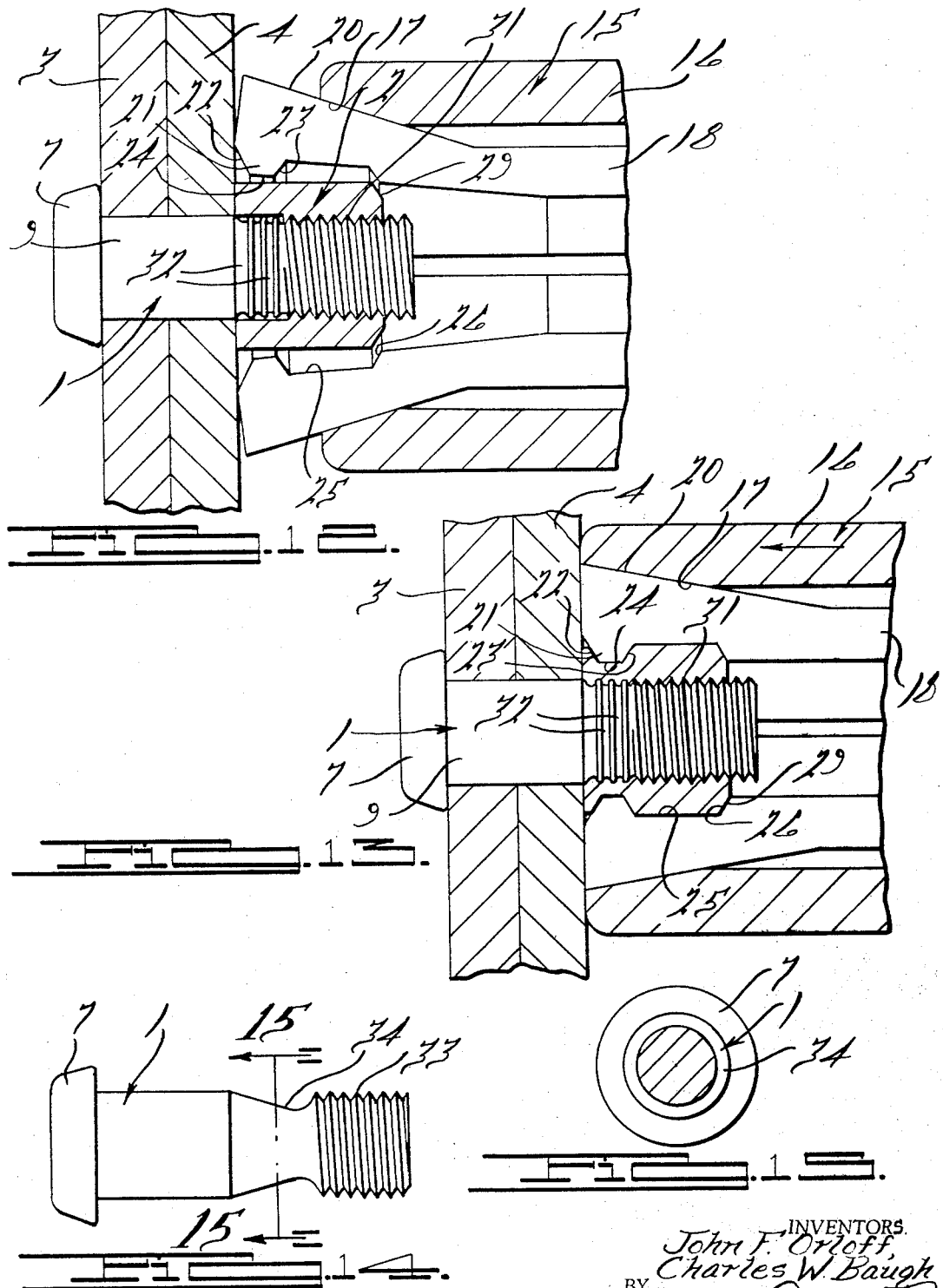

United States Patent Office 3,421,562
Patented Jan. 14, 1969

3,421,562
TENSION STRESSED STRUCTURE
John F. Orloff, Mount Clemens, and Charles W. Baugh, St. Clair Shores, Mich., assignors to Huck Manufacturing Company, Detroit, Mich., a corporation of Michigan
Filed Mar. 24, 1966, Ser. No. 537,117
U.S. Cl. 151—2     8 Claims
Int. Cl. F16b 39/30; B23p 11/00

ABSTRACT OF THE DISCLOSURE

A stressed structure and method of obtaining a stressed structure in which fasteners comprising a pin and collar are of such construction and are applied in such a way that uniform, high residual tension or clamping force results in the fastening pins and structure by first fixing the collar relative to the pin and thereafter crimping the collar to effect an elongation thereof and wherein such elongation of the collar stretches the pins to give said resulting uniform clamping force.

---

The present invention relates to an improved structural unit in which a plurality of overlapping members having aligned openings are secured together by a fastening means, including a unique pin and collar so applied that a stressed structure results, with the pin under high residual tension and to an improved method of obtaining said structural unit.

The terms residual tension, retained tension, and pre-load clamping force are used here interchangeably to describe the tension in the pin or bolt of the fastener produced in the setting of the fastener and which remains after the fastener is set. The residual tension produces advantages including a tight and rigid joint, high fatigue life and the ability to withstand higher tensile loads without failure.

The structure of the present invention includes a pin and collar in which the pin has an integral head at one end and peripheral grooves at the stem end, the outermost portion of these grooves being in the form of screw threads and the adjacent peripheral grooves being in a form to provide antirotation locking grooves. The pin is disposed through the openings of the structural members, with the stem projecting therethrough and a collar or nut is applied to the projecting end. The collar or nut has internal threads formed over a portion of its length with the remaining portion circular in cross-section and having smooth inner and outer surfaces of substantially uniform wall thicknesses. The collar is applied by torquing it onto the threaded end of the stem with the smooth collar portion overlying the locking grooves on the stem. After it is torqued on, and with relative low torque, the remaining circular and smooth portion is then swaged or crimped inwardly into the locking grooves. This crimping action effects an elongation of the collar which, having been snubbed and fixed relative to the pin by the threaded coaction, causes the pin to stretch and places the pin under a high tension which, together with the tension provided by the torquing action, results in a high tensile preload or high residual tension in the set fastener.

Stressed structures are known in which a bolt or pin is placed in high tension, and one such includes the ordinary nut and bolt. The amount of retained tension that is placed into the fastener in the nut and bolt arrangement is directly proportionate to the amount of torque applied to the nut. One of the difficulties with this type of fastener results from the fact that it is difficult to predetermine the retained tension in the final fastener with any consistent certainty, because the measured torque is affected by the friction between the nut and the bolt threads and also by the bearing surfaces of the nut and the adjacent member being secured. This varies with the fit between the nut and the bolt, and with the use or absence of lubricants. Furthermore, to get high residual tensions requires undesirably high torque.

Another known stressed fastener is the lockbolt, which comprises a pin and collar and in which the lockbolt pin has locking grooves, pull grooves, and a break-neck groove formed therebetween. A threadless or internally smooth collar is applied over the end of the pin, and a tool is applied which engages the pull grooves, pulls on the pin and applies a reaction force against the collar to cause the collar to be swaged into the locking grooves. After the completion of swaging the pull load builds up to break off that portion of the pin between the end and the break-neck. This portion of the pin is known as the pin-tail. In this fastener the amount of residual tension in the final fastener is designed into the fastening itself, and the desired residual tension may be attained with consistency. The amount of retained tension in the sum of the tension caused by the pull on the pin and tension created by the elongation of the collar as it is swaged into the lock grooves on the pin. This elongation of the collar is known as secondary clinch and results from the fact that, in the sign of lockbolts, the initial phase of swaging causes the collar to snub or attach itself to the pin, so that thereafter there can be no relative movement between pin and collar, and the continued swaging effects an elongation of the collar causing a stretch in the pin.

The lockbolt develops consistent and high pre-loads, but has disadvantages resulting from the pin tail, which must be discarded as scrap. This is particularly significant in the lockbolt as it has been developed in the larger sizes of 1″ to 1½″ in diameter, and in the use of expensive exotic materials, such as titanium, in the smaller sizes. An example of the lockbolt is disclosed in Patent No. 2,531,048.

Another known structure is the stump or high shear rivet, and these comprise a pin having either a plurality of locking grooves or a single locking groove. A collar is swaged onto the locking groove or grooves by a hammer drive set. The only residual tension that there can be in this type of rivet results from the swaging action, and it is relatively low as compared to those discussed above. Illustrative fasteners are disclosed in Patent No. 2,355,580 and No. 2,396,661.

One of the primary objects of the present invention is to provide a stressed fastener which, with relatively low torque applications, accomplishes a much higher, controlled and uniform residual tension that the nut and bolt described above, and gets higher residual tension than the lockbolt described above with the advantage that it has no pin-tail, and gets a much higher, controlled and uniform preload than the stump and high shear rivet described above.

A further object of the invention is to provide an improved structural unit with a highly stressed fastening means which can be consistently predetermined.

Other objects of the invention will become obvious from the following specifications and drawings related thereto, and from the claims hereinafter set forth.

In the drawings, in which like numerals are used to designate like parts in the several views throughout:

FIGURE 1 is a cross-sectional view, with parts in elevation, of the structure of the present invention showing the bolt or pin in place and the collar positioned before attachment to the pin;

FIG. 2 is an end elevation view taken in the direction of arrow 2 in FIG. 1;

FIG. 3 is an end elevation view taken in the direction of arrow 3 in FIG. 1;

FIG. 4 is a cross-sectional view taken substantially along the line 4—4 of FIG. 1;

FIG. 5 is an enlarged view similar to FIG. 1 showing the collar torqued or threaded onto the pin, and showing the crimping tool in position prior to crimping;

FIG. 6 is a view similar to FIG. 5 with the crimping tool shown at the completion of the crimping operation;

FIG. 7 is a view similar to FIG. 6 with the crimping tool removed and showing the crimped collar in elevation;

FIG. 8 is a cross-sectional view taken substantially along the line 8—8 of FIG. 6;

FIG. 9 is a side elevation view of a modified form of pin or bolt;

FIG. 10 is an enlarged view taken within the circle 10 on FIG. 9;

FIG. 11 is a partial cross-sectional view taken along the line 11—11 of FIG. 10;

FIG. 12 is a view similar to FIG. 5 showing a modified form of bolt or pin;

FIG. 13 is a view similar to FIG. 6 showing the structure of FIG. 12 crimped;

FIG. 14 is a side elevational view taken substantially of bolt or pin; and

FIG. 15 is a cross-sectional view taken substantially along the line 15—15 of FIG. 14.

Referring to the drawings, and referring particularly to FIGS. 1 through 8 thereof, one embodiment of the present invention is illustrated. This comprises a pin or bolt generally indicated at 1 and a collar or nut structure generally indicated at 2. A pair of overlapping panel members is shown at 3 and 4, having aligned openings 5 and 6, respectively, therethrough.

The pin 1 has an integral head 7, peripheral grooves in the form of screw threads 8 in the stem portion at the opposite end thereof, and an intermediate smooth shank 9. In the embodiment illustrated the aligned openings 5 and 6 are substantially cylindrical in shape and the smooth shank portion 9 is correspondingly shaped. It may fit into the openings with an interference fit, if desired. Also, if desired, the openings 5 and 6 could be tapered to form concentric openings, and the shank portion 9 would be correspondingly tapered for an interference fit, if desired.

That portion of the pin 1 which projects beyond the member 4 when the head 7 is seated against the member 3 is provided with peripheral grooves in the form of screw threads 8 from the stem end to the adjacent shank portion 9. A groove or grooves 10 are provided in the threaded portion 8 inwardly of the outer end and extending to a position adjacent the smooth shank 9. These grooves 10 are at an angle to the lead of the threads 8 and provide an antirotation means as will become apparent from the later description.

The outer end of the stem portion 8 is formed with a concentric hexagonal depression 11 which is adapted to receive a socket wrench to prevent the rotation of pin 1, if necessary, as the collar 2 is being torqued thereon.

The collar 2 is divided longitudinally into a threaded portion 12 and a concentric smooth portion 13. The collar 2 is circular in form, except for the outer end portion 14 which is formed with a 12-pointed and depressed configuration to receive a standard wrench for the purpose of turning the collar 2 onto the pin. That portion of the collar 2 defined by the smooth interior portion 13 is of substantially uniform wall thickness, and has a smooth, concentric outer surface.

With the pin in the position shown in FIG. 1 the collar 2 is applied over the projecting end portion 8 of the stem and is torqued or threaded thereon. The threaded portion 8 and the grooves 10 are of such length to satisfy variations in grip, the structure being illustrated in nominal grip.

The collar 2 is threadably tightened on the pin 1 by applying torque thereto and will serve to pull the sheets 3 and 4 together, if they happen to be separated, and upon further torquing will apply a tension in the pin 1. In the structure of the present invention relatively low torque need to be applied to the collar 2 for satisfactory results, because the final tension on the bolt is accomplished by crimping that portion of the collar 13 into the underlying threads 8 and grooves 10 which provide locking grooves.

In FIG. 5 the crimping tool, generally indicated at 15, is shown embracing the collar 2 and the pin 1 and in position for the crimping operation. The crimping tool 15 is known and forms no part of the present invention as a tool. An example of such tool is disclosed in U.S. Patent No. 3,029,665. It comprises an outer annular member or barrel 16 having a tapered circular mouth 17. A tubular crimping collet 18 is disposed within the annular member 16 and has four resilient fingers or jaws 19, each of which is of an arcuate width corresponding to substantially one-fourth of the circumference of the collet. These jaws 19 have tapered outer surfaces 20 complementary to the tapered annular surface 17. The fingers 19 have arcuate projections 21 extending thereacross, which are formed by angular side walls 22 and 23 and terminate in flat arcuate surfaces 24. In the embodiment illustrated the included angle between the surfaces 22 and 23 is substantially 60°.

Each of the fingers also includes an intermediate straight portion 25 terminating in an annular shoulder 26.

Motion is imparted to the crimping tool so that a relative motion is imparted to the collet 18 and the outer barrel member 16, so that the member 16 moves in the direction of the arrow 27. By the co-action between the tapered surfaces 17 and 20 the resilient fingers 19 are caused to move radially inwardly so that the projections 21 move into the metal of the collar in portion 13 and crimp the metal as shown in FIGS. 6 and 7 to permanently form depressions in the metal around the collar as indicated at 28 in FIG. 7 separated by longitudinally extending integral fins or narrow walls 28'. In the embodiment of the crimping tool illustrated, during this crimping action the arcuate tapered portions 26 on the fingers 19 engage a complementary end chamfer 29 on the collar.

This swaging or crimping action of the projections 21 causes an elongation of that portion of the collar having the smooth interior and uniform wall thickness, and, since the collar is snubbed to the pin by the coaction of the threaded portions of the collar and pin, this will cause a corresponding elongation of the pin and places the pin under an additional tension.

The material of the collar that is waged inwardly is also forced into the underlying threads 8 to form complementary interlocking grooves as shown in FIG. 6 and also in the grooves 10 which are at an angle to the screw threads and will serve as antirotation means for the collar. The impression of the collar into the underlying threads 8 form additional interlocking relationship between the collar and the pin, i.e., interlocking threads additional to the interlock between the preformed threads on the collar and the threads on the pin.

After the crimping operation the parts of the crimping tool are reset to the position shown in FIG. 5 and the tool may be removed. The crimping action is very fast.

It has been found that with this construction and action just described the fastening structure is highly stressed with a high residual tension in the bolt or pin. This is accomplished with relatively low torque applications, and, by combining these relatively low torque applications, with the crimping of the collar a much higher, controlled and uniform residual tension is accomplished in the pin and structure. It has also been found that even with variations in the torque applied to the nut that the resulting residual tension after crimping is relative uniform. Thus with the structure of the present invention, the ultimate residual tension desired in the structure may be accomplished with predetermined uniformity. It is not as sensitive to variations in torque as in prior structures and does not need the high torque that the prior structures require in order to obtain a high and yet uncertain residual tension in the fastener.

In FIGS. 9, 10 and 11 a modified form of anti-rotation means is provided in the pin 1. In this modification the threaded end portion 8 at that portion adjacent the smooth shank 9 is formed with spaced V-shaped knurlings 30 on the crests of the threads. When the collar is swaged to the position shown in FIG. 6 the metal of the collar is forced into the knurlings 30 which are transversed to the thread and serve as an antirotation means.

In FIGS. 12 and 13 another modified form of pin is shown in which the peripheral grooves on the projecting end of the stem include a screw threaded portion 31 at the end and an adjacent portion 32 which is in the form of a plurality of longitudinally spaced annular grooves. Thus when the collar is crimped as shown in FIG. 13 after it has been torqued to the desired extent, the metal of the collar is crimped into the annular locking grooves 32 and these grooves, together with the threads 31, serve as an anti-rotation means.

In FIGS. 14 and 15 a modified form of pin 1 is illustrated in which the projecting end of the pin is provided with peripheral grooves, the outermost being in the form of screw threads 33, as in all of the embodiments described above, and the adjacent portion being in the form of a single annular groove 34. Thus when this pin is applied as in FIGS. 12 and 13 the metal of the collar is forced into the groove 34 and this groove, in coaction with the threads 33, serves as an antirotation means.

In all of the embodiments described above the collars are torqued onto the pins, to provide sheet pull together if necessary, and to be sure that the nut is against the adjacent sheet, and the subsequent crimping action effects the elongation of the snubbed collar to place additional tension on the pin. The sum of the tensions placed on the pin by the torquing action and the crimping action determines the amount of retained or residual tension in the pin, also called preload. These loads may be varied by varying the relative proportion of the threaded part of the collar to the smooth part of the collar, by varying the wall thickness of the smooth part of the collar, and by varying the shape and configuration of the projections 21 and controlling the depth of penetration thereof into the collar during swaging.

While preferred embodiments of the invention have been shown and described, it will be understood that various changes and modifications may be made without departing from the spirit of the invention.

We claim:

1. An assembled joint including a plurality of overlying members having aligned openings therein, an improved tension stressed fastening means joining said members together comprising a pin and a collar, said pin having a head and a shank extending through said openings with said head engaging the outer surface of one of said members and with said shank projecting beyond the outer surface of the opposite of said members, peripheral grooves at the projecting shank end, the outermost grooves forming screw threads, and the adjacent innermost grooves forming locking grooves, a collar having a preformed internally threaded end portion and an adjacent circular portion, said collar being torqued onto said shank with the circular portion toward the work and with the preformed threaded portion outermost and with said circular portion overlying said locking grooves and crimped inwardly in a generally radial direction with said locking grooves impressed into said circular portion forming complementary interlocking grooves therein, said crimping effecting an elongation of said collar to thereby impart a residual tension in said pin and forming a plurality of depressions in and around the outer surface of said circular portion only which are separated by longitudinally extending integral ribs.

2. A structure in accordance with claim 1 in which that portion of the collar adjacent the threaded end portion is approximately one-third of the total length of the collar.

3. An assembled joint in accordance with claim 1 in which both the outermost grooves and the adjacent innermost grooves in the pin are in the form of continuous screw threads.

4. An assembled joint in accordance with claim 1 in which the adjacent innermost grooves are in the form of screw threads continuous with said outermost grooves and have spaced portions removed in the periphery thereof to provide anti-rotation locking grooves.

5. An assembled joint according to claim 1 in which the adjacent innermost grooves are constructed to include longitudinally extending grooves to form anti-rotation locking grooves.

6. The method of fastening a plurality of overlapping members together in which said members have aligned openings which comprises inserting a pin having a head and a shank through said openings so that said head engages the outer surface of one of said members and so that said shank projects beyond the outer surface of the opposite of said members, the projecting portion of said shank having peripheral grooves, the outermost of which grooves forms screw threads and adjacent innermost grooves form locking grooves, applying a collar which has a preformed internally threaded end portion and an adjacent annular and internally smooth portion of said screw threads with the smooth end against the work and the threaded portion at the outside by torquing said collar onto said shank with said smooth portion overlying said locking grooves, thereafter applying a crimping force in a generally inwardly radial direction to the smooth portion of said collar to thereby effect an elongation to said collar and impart a residual tension in said pin.

7. The method according to claim 6 in which the smooth overlying portion of the collar has both inner and outer surfaces smooth and of uniform wall thickness and in which the crimping force is applied substantially uniformly therearound.

8. The method according to claim 6 in which in addition to effecting an elongation to the collar and imparting a residual tension to the pin, the crimping force also impresses the smooth portion of the collar into the locking grooves to form complementary grooves therein in addition to said screw threads.

References Cited

UNITED STATES PATENTS 341,146   5/1886   Howes _____ 85—32

EDWARD C. ALLEN, *Primary Examiner.*

U.S. Cl. X.R.

29—517

UNITED STATES PATENT OFFICE
CERTIFICATE OF CORRECTION

Patent No. 3,421,562 January 14, 1969

John F. Orloff et al.

It is certified that error appears in the above identified patent and that said Letters Patent are hereby corrected as shown below:

Column 1, line 35, "The" should read -- This --; line 52, "that" should read -- than --. Column 3, line 25, "taken substantially" should read -- of a modified form --; line 55, after "become" insert -- more --. Column 4, line 8, after "need" cancel "to"; line 54, "waged" should read -- swaged --; line 58, "as" should read -- an --. Column 6, line 41, "of" should read -- to --; line 63, cancel "341,146   5/1886   Howes ---- 85-32" and insert the following:

| | | | |
|---|---|---|---|
| 278,248 | 5/1883 | Lipsey | 151-21C |
| 341,146 | 5/1886 | Howes | 85-32 |
| 1,191,754 | 7/1916 | Anderson | 151-21C |
| 1,892,119 | 12/1932 | Thompson | 151-2A |
| 2,542,376 | 2/1951 | Torresen | 85-5 |
| 2,895,367 | 7/1959 | Nagy | 85-5 |
| 3,163,197 | 12/1964 | Rosan et al | 151-2 |
| 3,196,529 | 7/1965 | Schwinghamer | 85-7 |
| 3,290,982 | 12/1966 | Marschner | 85-1 |

FOREIGN REFERENCE

| | | |
|---|---|---|
| 188,267 | 11/1922 | Great Britain |

Signed and sealed this 17th day of March 1970.

(SEAL)
Attest:

EDWARD M. FLETCHER, JR.
Attesting Officer

WILLIAM E. SCHUYLER, JR.
Commissioner of Patents